(12) United States Patent
Lee et al.

(10) Patent No.: US 11,001,954 B2
(45) Date of Patent: May 11, 2021

(54) CLOTHING TREATMENT DEVICE AND METHOD FOR CONTROLLING CLOTHING TREATMENT DEVICE

(71) Applicant: LG Electronics Inc., Seoul (KR)

(72) Inventors: Jihong Lee, Seoul (KR); Yanghwan No, Seoul (KR); Inhee Han, Seoul (KR); Jonghwan Lee, Seoul (KR); Chanho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 350 days.

(21) Appl. No.: 16/070,134

(22) PCT Filed: Jan. 3, 2017

(86) PCT No.: PCT/KR2017/000042
§ 371 (c)(1),
(2) Date: Jul. 13, 2018

(87) PCT Pub. No.: WO2017/126823
PCT Pub. Date: Jul. 27, 2017

(65) Prior Publication Data
US 2019/0024285 A1      Jan. 24, 2019

(30) Foreign Application Priority Data

Jan. 19, 2016   (KR) .......................... 10-2016-0006248

(51) Int. Cl.
*D06F 39/02* (2006.01)
*D06F 33/00* (2020.01)
(Continued)

(52) U.S. Cl.
CPC .............. *D06F 33/00* (2013.01); *D06F 37/12* (2013.01); *D06F 39/02* (2013.01); *D06F 39/087* (2013.01);
(Continued)

(58) Field of Classification Search
CPC ...................................................... D06F 39/02
See application file for complete search history.

(56) References Cited

U.S. PATENT DOCUMENTS

| 2003/0061843 A1 | 4/2003 | Ryu et al. |
| 2010/0018258 A1 | 1/2010 | Cho et al. |

(Continued)

FOREIGN PATENT DOCUMENTS

| GB | 1110375 | * | 4/1968 |
| JP | H1-69481 | * | 5/1989 |

(Continued)

OTHER PUBLICATIONS

Translation of JPH1-69481.*
Extended European Search Report in European Application No. 17741589.0, dated Aug. 2, 2019, 7 pages.

*Primary Examiner* — Levon J Shahinian
*Assistant Examiner* — Jason P Riggleman
(74) *Attorney, Agent, or Firm* — Fish & Richardson P.C.

(57) ABSTRACT

The present invention relates to a clothing treatment device comprising: a tub body for providing a space in which water is stored; a tube cover that forms the upper surface of the tub body; an introduction opening provided to penetrate the tub cover; a door provided on the tub cover so as to open/close the introduction opening; a drum rotatably provided inside the tub body so as to contain clothing introduced through the introduction opening; a storage portion provided on the door so as to provide a space in which an additive is stored; a channel portion for guiding at least a part of water, which moves from the tub body toward the tub cover when the drum rotates, to the storage portion; and a discharge portion for discharging the additive inside the storage portion and the water, which has been introduced into the storage portion, to the tub body.

19 Claims, 5 Drawing Sheets

(51) Int. Cl.
 *D06F 37/12* (2006.01)
 *D06F 39/08* (2006.01)
 *D06F 23/04* (2006.01)
 *D06F 31/00* (2006.01)

(52) U.S. Cl.
 CPC .............. *D06F 23/04* (2013.01); *D06F 31/00* (2013.01); *D06F 39/088* (2013.01); *D06F 2202/085* (2013.01); *D06F 2204/06* (2013.01); *Y02B 40/00* (2013.01)

(56) References Cited

U.S. PATENT DOCUMENTS

| | | |
|---|---|---|
| 2012/0111067 A1 | 5/2012 | Leibman et al. |
| 2015/0059418 A1 | 3/2015 | Lee et al. |

FOREIGN PATENT DOCUMENTS

| | | |
|---|---|---|
| KR | 1020040069124 | 8/2004 |
| KR | 1020080065765 | 7/2008 |
| KR | 1020110009917 | 1/2011 |
| KR | 1020150135043 | 12/2015 |
| WO | WO2007/122484 A2 * | 11/2007 |
| WO | WO2012150539 | 11/2012 |

\* cited by examiner

[Fig. 1]
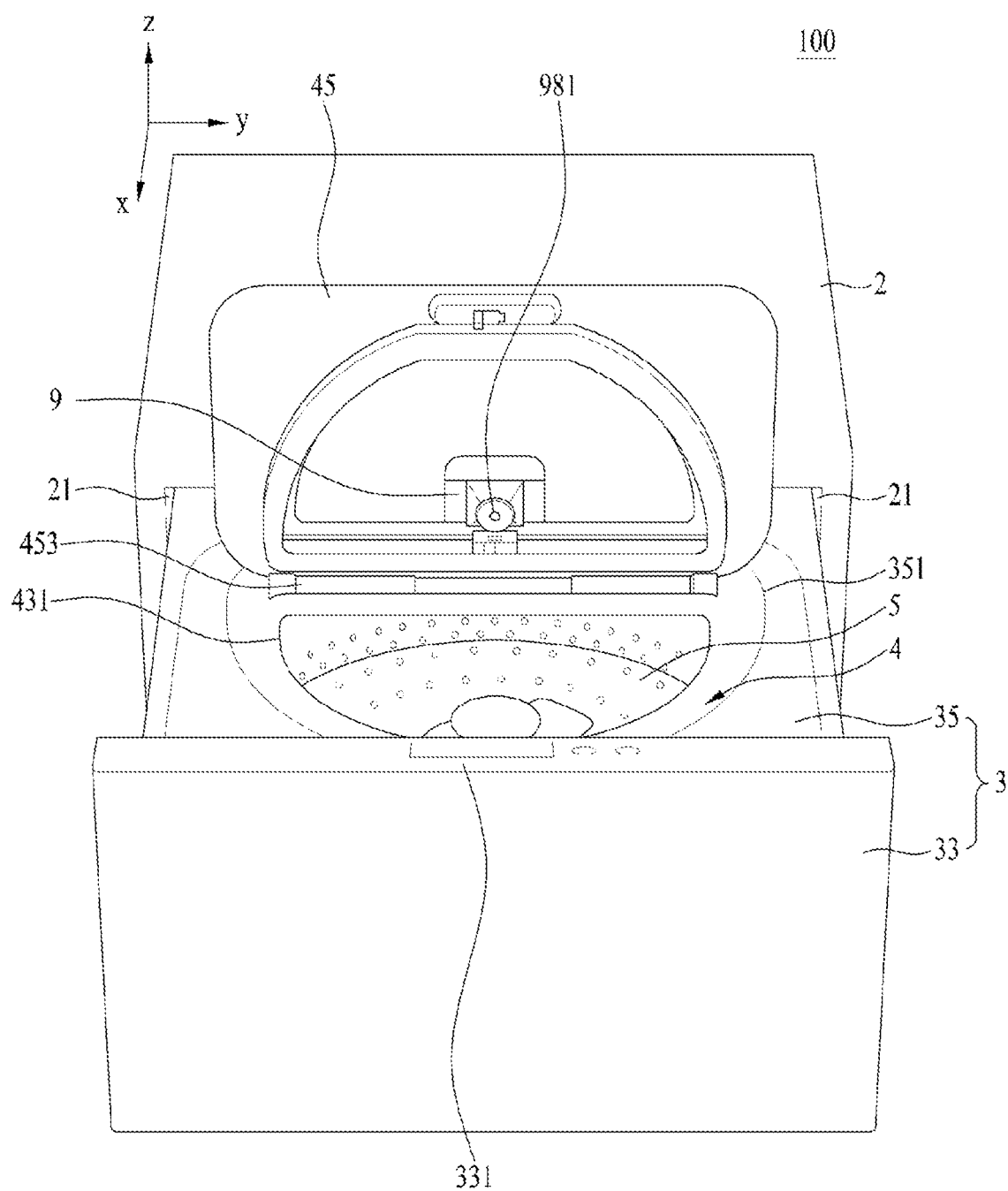

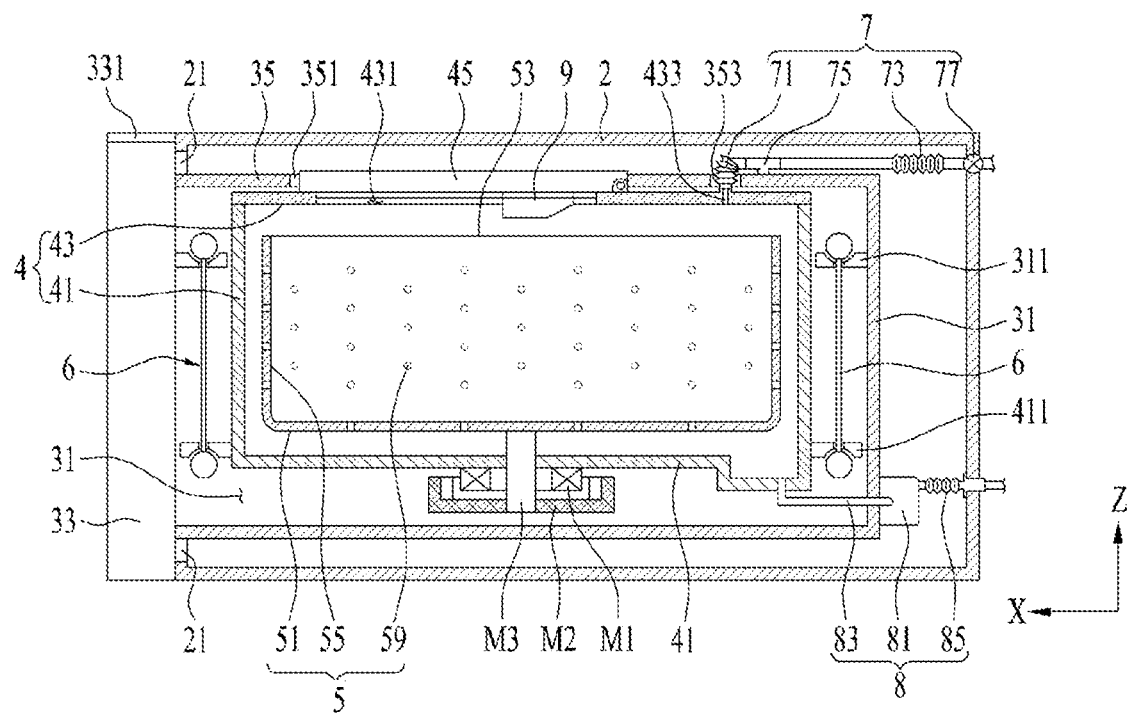
[Fig. 2]

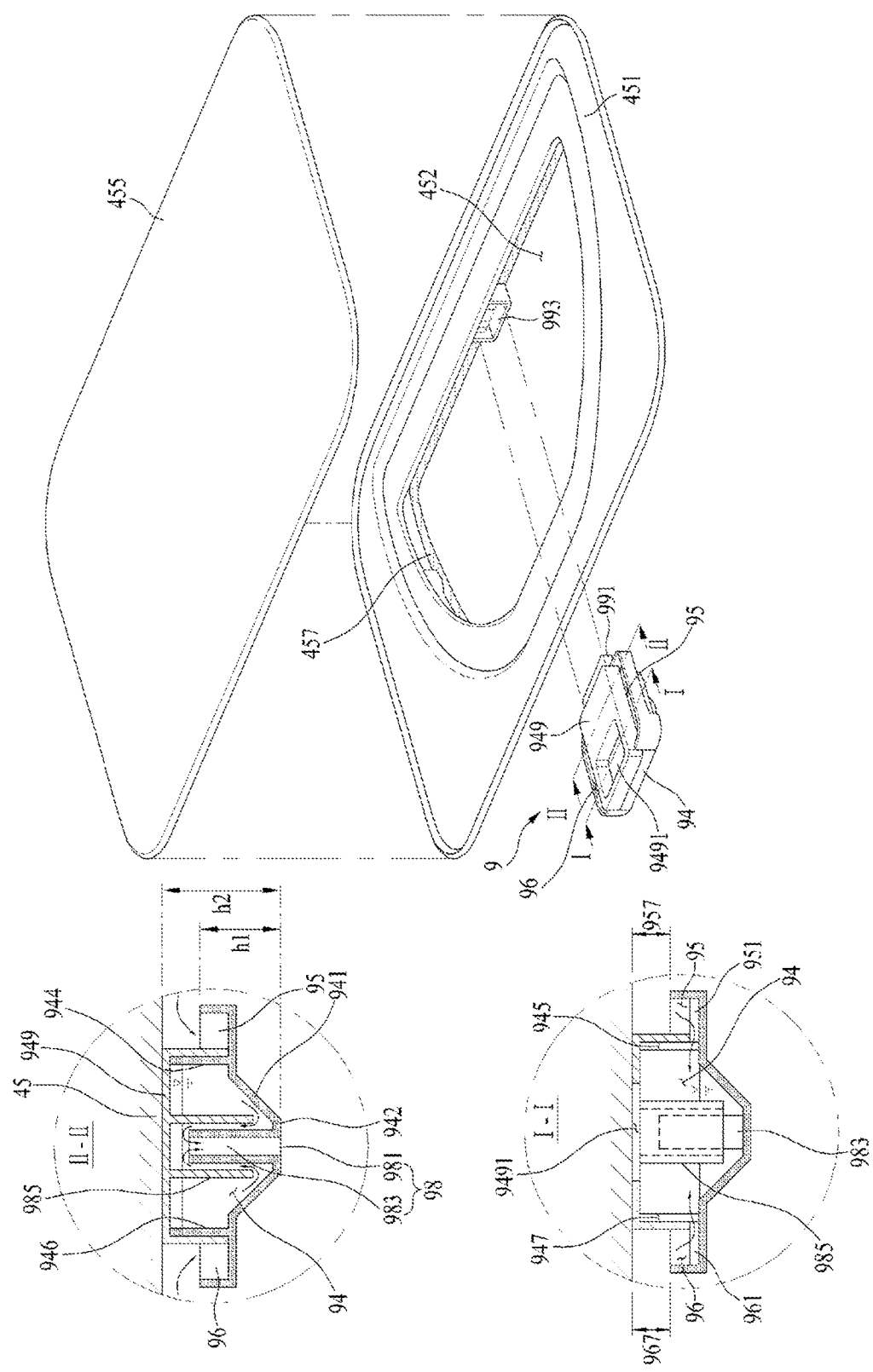
[Fig. 3]

[Fig. 4]
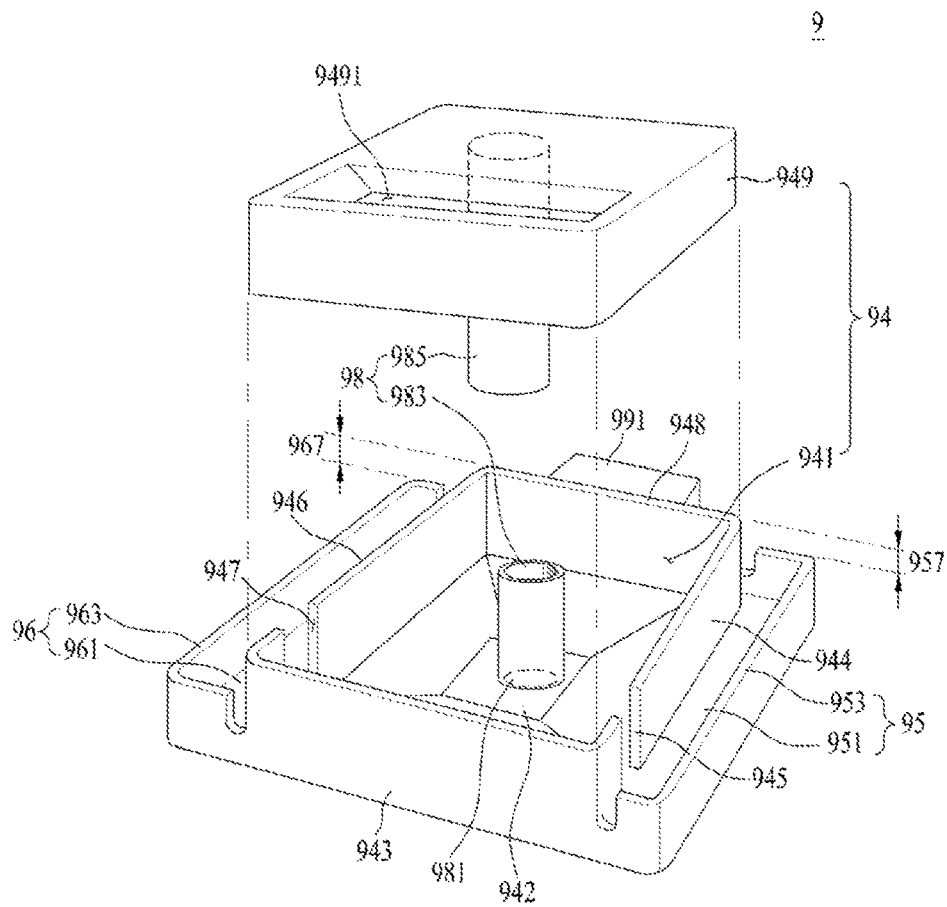
[Fig. 5]
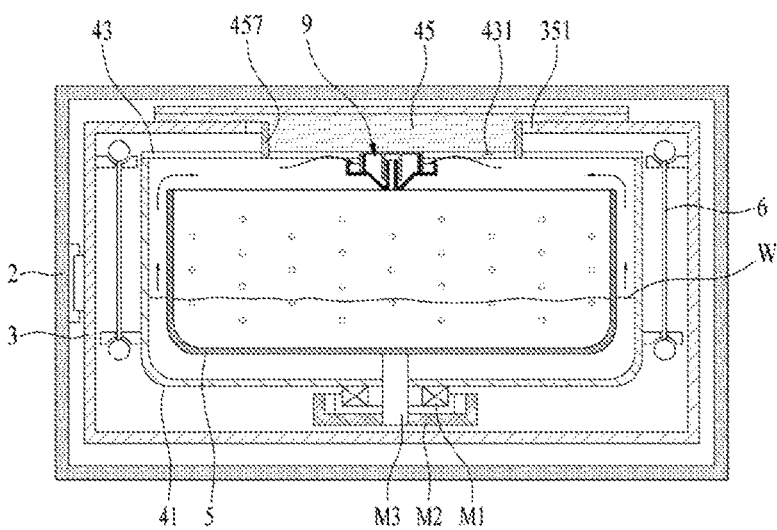

【Fig. 6】
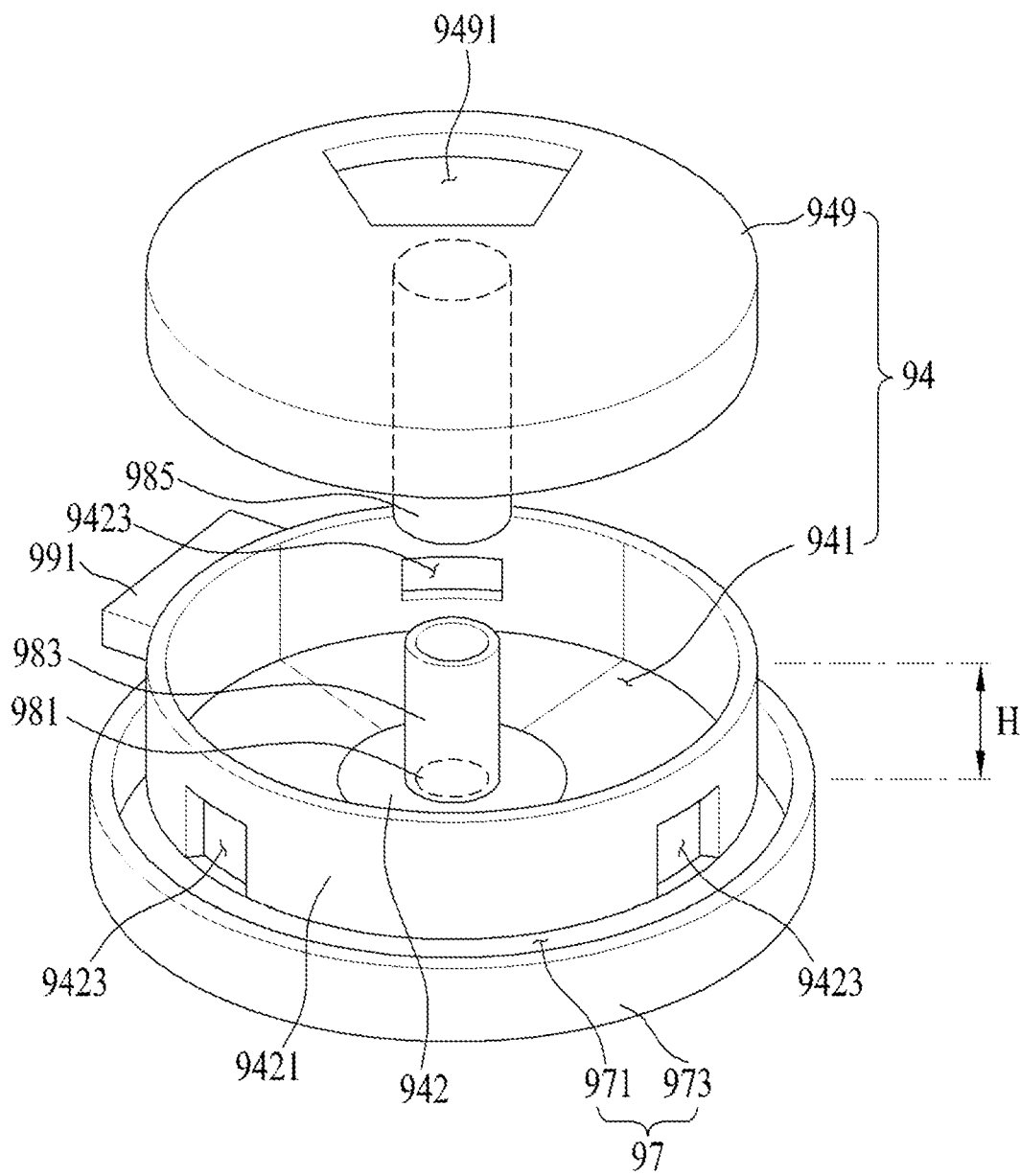

CLOTHING TREATMENT DEVICE AND METHOD FOR CONTROLLING CLOTHING TREATMENT DEVICE

CROSS-REFERENCE TO RELATED APPLICATIONS

This application is a National Stage application under 35 U.S.C. § 371 of International Application No. PCT/KR2017/000042, filed Jan. 3, 2017, which claims the benefit of Korean Application No. 10-2016-0006248, filed on Jan. 19, 2016. The disclosures of the prior applications are incorporated by reference in their entirety.

TECHNICAL FIELD

The present invention relates to a laundry treatment apparatus and a control method thereof.

BACKGROUND ART

Generally, laundry treatment apparatuses include an apparatus that washes laundry (a washing object or a drying object), an apparatus that dries laundry, and an apparatus that is capable of performing both washing and drying of laundry.

Conventional laundry treatment apparatuses are divided into a front-loading type, in which laundry is introduced into the apparatus through an opening provided in the front surface of the apparatus, and a top-loading type, in which laundry is introduced into the apparatus through an opening provided in the top surface of the apparatus.

A top-loading-type laundry treatment apparatus includes a cabinet, a tub provided inside the cabinet and having an opening in the top surface thereof, a drum rotatably provided inside the tub, and a door configured to open and close the opening.

In the conventional laundry treatment apparatus described above, a detergent supply unit is provided inside the cabinet in order to supply detergent into the tub. The conventional detergent supply unit generally includes a storage unit in which detergent is stored, a discharge unit configured to guide the detergent inside the detergent storage unit to the tub, and a water supply unit configured to interconnect a water source and the storage unit.

That is, the detergent supply unit provided in the conventional laundry treatment apparatus has a structure in which water is supplied from the water source to the storage unit so that the detergent stored in the storage unit is supplied, together with water, to the tub. Accordingly, the conventional detergent supply unit may require the water supply unit to be configured so as to interconnect the water source and the storage unit, and it is necessary to provide the space for the installation of a device, which supplies water to the detergent supply unit, inside the cabinet.

DISCLOSURE

Technical Problem

One object of the present invention devised to solve the problem lies in a laundry treatment apparatus, which supplies an additive, such as detergent or a fabric softener, to laundry using variation in the level of water occurring inside a tub when a drum rotates and also using a siphon phenomenon, and a control method thereof.

In addition, another object of the present invention devised to solve the problem lies in a laundry treatment apparatus, the volume of which may be minimized because a supply unit thereof does not need to receive water from a water source, and a control method thereof.

Technical Solution

The object of the present invention can be achieved by providing a laundry treatment apparatus including a tub body providing a space in which water is stored, a tub cover forming a top surface of the tub body, an introduction opening formed in the tub cover, a door provided on the tub cover to open and close the introduction opening, a drum rotatably provided inside the tub body to accommodate laundry introduced through the introduction opening, a storage unit providing a space in which an additive is stored, the storage unit being provided in the door, a flow path unit configured to guide at least some of water, moving from the tub body to the tub cover when the drum rotates, to the storage unit, and a discharge unit configured to discharge the additive inside the storage unit and the water introduced into the storage unit to the tub body.

The discharge unit may move the water and the additive inside the storage unit to the tub body using a siphon phenomenon.

The storage unit may include a body providing the space in which the additive is stored, a cover located on a top surface of the body, and an additive introduction opening formed in the cover, and the discharge unit may include a discharge hole formed in the body, a discharge pipe protruding from the body towards the cover and surrounding the discharge hole, and an accommodation pipe protruding from the cover towards the body so that the discharge pipe is inserted thereinto, so as to guide the water inside the storage unit to the discharge pipe.

The discharge pipe may have a length required to prevent a free end thereof from being in contact with the cover, and the accommodation pipe may have a length required to prevent a free end thereof from being in contact with the body.

The body may include a bottom surface provided with the discharge hole, a partition provided to surround the bottom surface so as to interconnect the bottom surface and the cover, and a communication portion formed in the partition for communication of an inside of the body with an outside of the body, and the flow path unit may include a guide provided to surround at least a portion of the partition, an inlet configured to introduce the water moving along the tub cover into the guide, and a base configured to guide the water inside the guide to the communication portion.

The guide may be provided so as to surround the communication portion.

The inlet may be a guide through-hole formed in the guide to introduce the water moving along the tub cover into the base.

The inlet may be a space formed when a height of the guide from the bottom surface is less than a height of the partition from the bottom surface.

The base may further include a slope that is inclined towards the inlet.

The body may be separably coupled to the door.

The laundry treatment apparatus may further include a cabinet, a drawer providing a space in which the tub body is accommodated, the drawer being introduced into or removed from the cabinet, a water supply unit configured to supply water to the tub body, and a drain unit configured to discharge the water inside the tub body to an outside of the cabinet.

There is provided a control method of a laundry treatment apparatus including a tub body providing a space in which water is stored, a tub cover forming a top surface of the tub body, an introduction opening formed in the tub cover, a door provided on the tub cover to open and close the introduction opening, a drum rotatably provided inside the tub body to accommodate laundry introduced through the introduction opening, a storage unit providing a space in which an additive is stored, the storage unit being provided in the door, a flow path unit configured to introduce water into the storage unit, and a discharge unit configured to discharge the additive inside the storage unit and the water introduced into the storage unit to the tub body using a siphon phenomenon, the control method including supplying water to the tub body, rotating the drum at a rotational speed that is less than a predetermined reference rotational speed, moving at least some of the water stored in the tub body to the flow path unit by rotating the drum at a rotational speed that is equal to or greater than the predetermined rotational speed, before initiating the rotating or while performing the rotating.

The reference rotational speed may be set to a rotational speed that provides centrifugal force to the water so as to cause at least some of the water stored in the tub body to rise to the tub cover.

The rotating may include primarily forming a water stream inside the tub body by rotating the drum at the rotational speed that is less than the reference rotational speed, discharging the water stored in the tub body after completion of the primarily forming, additionally supplying water to the tub body after completion of the discharging, and secondarily forming a water stream inside the tub body by rotating the drum at the rotational speed that is less than the reference rotational speed.

The supplying may include supplying the water to the tub body so that a level of water inside the tub body is maintained higher than a bottom surface of the drum, and the moving may be performed after the supplying is completed and before the primarily forming is initiated.

The primarily forming may be performed to separate impurities from the laundry using the additive stored in the storage unit.

The additionally supplying may include supplying the water to the tub body so that a level of water inside the tub body is maintained higher than a bottom surface of the drum, and the moving may be performed after the additionally supplying is completed and before the secondarily forming is initiated.

The primarily forming may be performed to separate detergent from the laundry by forming the water stream inside the tub, and the secondarily forming may be performed to increase softness of the laundry by supplying the additive stored in the storage unit to the tub body.

Advantageous Effects

The present invention may provide a laundry treatment apparatus, which supplies an additive, such as detergent or a fabric softener, to laundry using variation in the level of water occurring inside a tub when a drum rotates and using a siphon phenomenon, and a control method thereof.

In addition, the present invention may provide a laundry treatment apparatus, the volume of which may be minimized because a supply unit does not need to receive water from a water source, and a control method thereof.

DESCRIPTION OF DRAWINGS

FIGS. 1 and 2 illustrate an exemplary laundry treatment apparatus according to the present invention.

FIG. 3 illustrates a door and a supply unit according to the present invention.

FIGS. 4 and 5 illustrate an exemplary supply unit according to the present invention.

FIG. 6 illustrates another embodiment of the supply unit according to the present invention.

BEST MODE

Reference will now be made in detail to the exemplary embodiments of the present invention, examples of which are illustrated in the accompanying drawings. Meanwhile, the configuration of an apparatus or a control method thereof, which will be given below, is merely intended to explain exemplary embodiments of the present invention, rather than limiting the technical scope of the present invention. Throughout the specification, the same reference numerals denote the same constituent elements.

As illustrated in FIGS. 1 and 2, a laundry treatment apparatus 100 of the present invention includes a cabinet 2, a drawer 3 provided so as to be introduced into and removed from the cabinet, a tub 4 provided inside the drawer to store water therein, and a drum 5 rotatably provided inside the tub to store laundry therein.

The cabinet 2 may serve to define the external appearance of the laundry treatment apparatus, and may also serve as the space in which the drawer 3 is accommodated. In either case, an opening 21, through which the drawer 3 is inserted, may be provided in the front surface of the cabinet 2.

The cabinet 2 may have a longer length in the width direction (Y-axis direction) than in the height direction (Z-axis direction) (i.e., the drawer may have a longer length in the width direction than in the height direction).

The drawer 3 includes a drawer body 31 (see FIG. 2), which is inserted to the inside of the cabinet 2 through the opening 21, a drawer panel 33, which is fixed to the front surface of the drawer body 31 to open and close the opening 21, and a drawer cover 35, which defines the top surface of the drawer body 31.

The drawer panel 33 may be provided with a control panel 331, which allows a user to input a control command related to the operation of the laundry treatment apparatus 100, and displays a message related to the operation of the laundry treatment apparatus to the user.

The drawer body 31 may have any shape so long as it may be inserted into the cabinet 2 through the opening 21 and may provide the space in which the tub 4 is accommodated. FIG. 1 illustrates an example of the drawer body 31 having an empty hexahedral shape.

As illustrated in FIG. 2, the drawer cover 35 includes a first through-hole 351 and a second through-hole 353 for communication of the inside of the drawer body 31 with the outside. The first through-hole 351 is provided in order to enable the introduction and discharge of laundry, and the second through-hole 353 is provided in order to supply water required to wash laundry. A detailed description thereof will be made below.

The tub 4 includes a tub body 41, which is located inside the drawer body 31 and stores water therein, and a tub cover 43, which defines the top surface of the tub body 41. The tub body 41 may take the form of a cylinder having an open top side.

The tub cover 43 may include an introduction opening 431 for communication of the inside of the tub body 41 with the outside of the tub body, and a water supply opening 433, through which water is introduced into the tub body 41.

The introduction opening 431 may be provided under the first through-hole 351 provided in the drawer cover, and the water supply opening 433 may be provided under the second through-hole 353 provided in the drawer cover.

The introduction opening 431 is used to supply laundry to the inside of the tub body 41 or to discharge the laundry inside the tub body 41 to the outside of the tub body. The introduction opening 431 is opened and closed by a door 45, which is rotatably coupled to the tub cover 43.

As illustrated in FIG. 3, the door 45 may include a first frame 451 coupled to the tub cover 43 via a hinge 453 (see FIG. 1) and a second frame 455 provided on the first frame 451.

In this case, the first frame 451 may include a frame through-hole 452 formed therethrough, and the second frame 455 may be formed of a transparent material. This serves to enable the inside of the tub body 41 to be checked from the outside.

In order to prevent the water inside the tub body 41 from being discharged to the outside of the tub body 41 through the introduction opening 431, one of the first frame 451 and the tub cover 43 may further be provided with a sealing unit 457, which hermetically closes the space between the first frame 451 and the introduction opening 431 when the door 45 closes the introduction opening 431.

As illustrated in FIG. 2, the tub 4 having the above-described structure is coupled to the drawer body 31 via a tub support unit 6. The tub support unit 6 may be provided so as to interconnect a drawer bracket 311 provided on the drawer body 31 and a tub bracket 411 provided on the tub body 41.

One end of the tub support unit 6 may be shaped so as to be seated in the drawer bracket 311 and to be movable inside the drawer bracket 311. The other end of the tub support unit 6 may be shaped so as to support the tub bracket 411 and to be movable inside the tub bracket 411.

FIG. 2 illustrates an exemplary case in which spherical connectors are respectively provided on both ends of the tub support unit 6 so as to be movable inside the drawer bracket and the tub bracket.

The drum 5, provided inside the tub 4, may include a cylindrical drum body 51 having a drum introduction opening 53 provided in the top surface thereof. Since the drum introduction opening 53 is located under the introduction opening 431, the laundry supplied through the introduction opening 431 may be supplied to the drum body 51 through the drum introduction opening 53.

A plurality of drum through-holes 59 may be provided in the bottom surface and the circumferential surface 55 of the drum body 51 for communication of the inside of the drum body 51 with the tub body 41.

The drum body 51 is rotated by a drive unit within the tub body 41. The drive unit may include a stator M1, which is located outside the tub body 41 and is fixed to the bottom surface of the tub body, a rotor M2, which is rotated by a rotating magnetic field provided by the stator, and a rotating shaft M3, which penetrates the bottom surface of the tub body 41 to interconnect the bottom surface 57 of the drum and the rotor M2.

In this case, the rotating shaft M3 may be provided to form a right angle relative to the bottom surface of the tub body 41, and the drum introduction opening 53 may be provided so as to be parallel to the ground.

The laundry treatment apparatus 100 having the above-described structure functions to supply water to the tub 4 through a water supply unit 7 and to discharge the water stored in the tub 4 to the outside of the cabinet 2 through a drain unit 8.

The water supply unit 7 may include a first water supply pipe 71, which is connected to the water supply opening 433 provided in the tub cover, a second water supply pipe 73, which is connected to a water source located outside the cabinet, and a connection pipe 75, which is fixed to the tub cover 43 to interconnect the first water supply pipe and the second water supply pipe.

The first water supply pipe 71 may interconnect the water supply opening 433 and the connection pipe 75 through the second through-hole 353 provided in the drawer cover 35, and may be a bellows-shaped pipe (a pipe having a structure or formed of a material to enable a flexible change in length) in order to prevent the first water supply pipe 71 from being separated from the connection pipe 75 when the tub 4 vibrates.

In addition, in order to prevent the second water supply pipe 73 from being separated from the connection pipe 75 when the drawer 3 is removed from the cabinet 2, the second water supply pipe 73 may also be a bellows-shaped pipe. The second water supply pipe 73 is opened and closed by a water supply valve 77, which is controlled by a controller (not illustrated).

Unlike what is illustrated in FIG. 2, the water supply unit 7 may include a single water supply pipe, which interconnects the water source (not illustrated) located outside the cabinet and the water supply opening 433 provided in the tub cover. In this case, at least a portion of the water supply pipe may take the form of a bellows-shaped pipe.

The drain unit 8 may include a drain pump 81 fixed to the drawer body 31, a first drain pipe 83, which guides the water inside the tub body 41 to the drain pump 81, and a second drain pipe 85, which guides the water discharged from the drain pump 81 to the outside of the cabinet 2. In this case, the second drain pipe 85 may be a bellows-shaped pipe.

In order to minimize the volume of the laundry treatment apparatus 100 having the above-described structure, it is necessary to reduce the distance between the drawer cover 35 and the tub cover 43 and the distance between the tub cover 43 and the upper end of the drum.

However, when the distances between the drawer cover, the tub cover, and the drum upper end are minimized, it is difficult to secure the space for the installation of a supply unit, which supplies an additive (e.g., detergent or a fabric softener), to the tub 4, or a separate flow path for supplying water to the supply unit (i.e. the flow path that interconnects the water source and the supply unit).

In order to solve this problem, the present invention may further include a supply unit 9, which is capable of supplying an additive to the tub 4 using the water stored inside the tub 4, rather than using the flow path connected to the water source.

The supply unit 9 according to the present invention has a feature in which an additive moves to the tub 4 along with water using a phenomenon in which water moves from the tub body 41 to the tub cover 43 by centrifugal force when the drum 5 rotates and using a siphon phenomenon that occurs inside the supply unit. The supply unit 9 may be provided in any region of the tub cover 43 in order to realize the above-described function.

FIG. 2 illustrates an exemplary case in which the supply unit 9 is provided in the door 45, which forms a portion of the tub cover 43. The following description will be made based on the case in which the supply unit 9 is provided in the door 45.

As illustrated in FIG. 3, the supply unit 9 includes a storage unit 94, which is provided in the door 45 to provide the space in which an additive is stored, a flow path unit 95 and 96, which guides at least some of the water, which moves from the tub body 41 to the tub cover 43 when the drum 5 rotates, to the storage unit, and a discharge unit 98, which discharges the additive inside the storage unit 94 and the water introduced into the storage unit 94 to the tub body 41 using a siphon phenomenon.

As illustrated in FIG. 4, the storage unit 94 may include a body 941, which provides the space in which the additive (e.g., detergent or a fabric softener) is stored, and a cover 949, which forms the top surface of the body. In this case, the cover 949 may include an additive introduction opening 9491, which is formed in the cover 949 to enable the introduction of the additive to the body 941.

The body 941 may have any shape so long as it is capable of storing the additive therein. FIG. 4 illustrates an exemplary case in which the body 941 has a hexahedral shape with an open top side.

In this case, the body 941 may include a bottom surface 942 and a partition, which extends from the edge of the bottom surface towards the cover 949 to interconnect the body 941 and the cover 949.

When the body 941 has a hexahedral shape, the partition may include a first partition 943, a second partition 944, a third partition 946, and a fourth partition 948. Alternatively, when the body 941 has a cylindrical shape, the partition may include a single partition surrounding the bottom surface 942.

The partition includes communication portions 945 and 947 for communication of the inside of the body 941 with the outside. FIG. 4 illustrates an exemplary case in which a first communication portion 945 is formed in the second partition 944 and a second communication portion 947 is formed in the third partition 946.

The flow path unit 95 and 96 serves to guide at least some of the water, which moves from the tub body 41 to the tub cover 43 when the drum rotates, to the communication portions 945 and 947. The flow path unit may have any structure so long as it may realize the above-described function.

FIG. 4 illustrates an exemplary case in which the flow path unit includes a first flow path 95, which supplies water to the first communication portion 945, and a second flow path 96, which supplies water to the second communication portion 947.

In this case, the respective flow paths 95 and 96 may include a guide 953 or 963 provided so as to surround at least a portion of the partition, an inlet 957 or 967 formed to introduce the water moving along the tub cover 43 into the guide, and a base 951 or 961 configured to guide the water inside the guide 953 or 963 to a corresponding one of the communication portions 945 and 947.

That is, the first flow path 95 may include a first guide 953 provided so as to surround at least a portion of the second partition 944 (the portion in which the first communication portion is located) and a first base 951 configured to guide the water introduced into the first guide to the first communication portion 945. The second flow path 96 may include a second guide 963 provided so as to surround at least a portion of the third partition 946 (the portion in which the second communication portion is located) and a second base 961 configured to guide the water introduced into the second guide to the second communication portion 947.

When a free end of the first guide 953 and a free end of the second guide 963 extend to the height at which they are in contact with the door 45 (a position higher than the top surface of the cover), the inlets may be guide through-holes (not illustrated) formed in the first guide 953 and the second guide 963.

However, when the free end of the first guide 953 and the free end of the second guide 963 are provided at a position lower than the top surface of the cover 949, the inlets may be spaces 957 and 967 formed between the free ends of the respective guides and the door 45.

That is, as illustrated in FIG. 3, the first inlet 957, through which water is introduced into the first base 951, may be provided in a manner such that the height h1 of the first guide 953 from the bottom surface 942 of the base is less than the height h2 of the top surface of the cover 949 from the bottom surface 942. The first inlet 967, through which water is introduced into the second base 961, may be provided in a manner such that the height of the second guide 963 from the bottom surface 942 of the base is less than the height of the top surface of the cover from the bottom surface 942.

In the case in which the inlets 957 and 967 are the spaces formed between the free ends of the respective guides and the door, it is easier to introduce the water moving to the tub cover 43 to the flow path unit 95 and 96 than in the case in which the inlets are guide through-holes formed in the respective guides.

As illustrated in FIG. 4, in order to allow the entirety of water inside the first flow path 95 to move to the first communication portion 945, the first base 951 may be a slope inclined towards the first communication portion 945. For the same reason, the second base 961 may be a slope inclined towards the second communication portion 947.

The discharge unit 98 may include a discharge hole 981, which is formed in the bottom surface 942 of the body, a discharge pipe 983, which protrudes from the bottom surface 942 towards the cover 949 and surrounds the discharge hole 981, and an accommodation pipe 985, which extends from the cover 949 towards the bottom surface 942 so as to allow the discharge pipe 983 to be inserted thereinto.

In order to allow the water inside the body 941 to move to the discharge pipe 983, the inner circumferential surface of the accommodation pipe 985 must not be in contact with the outer circumferential surface of the discharge pipe 983.

Meanwhile, in order to induce a siphon phenomenon, the discharge pipe 983 needs to have a length such that a free end of the discharge pipe is not in contact with the cover 949, and the accommodation pipe 985 needs to have a length such that a free end of the accommodation pipe is not in contact with the bottom surface 942 of the body.

The supply unit 9 having the above-described structure may be fixed to one of the door 45 or the tub cover 43, or may be separably coupled to the door 45 or the tub cover 43.

When the supply unit 9 is fixed to the door or the tub cover, the additive introduction opening 9491 must be provided at a position that is accessible to the user when opening the door 45, so as to be exposed.

When the supply unit 9 is separably coupled to the door 45 or the tub cover 43, the supply unit 9 may further include separable coupling portions, which fix at least one of the storage unit 94 or the cover 949 to the door 45 or the tub cover 43.

FIG. 3 illustrates an exemplary case in which the supply unit 9 is separably coupled to the door 45. In this case, the separable coupling portions 991 and 993 may include a first separable coupling portion 991 (a protrusion) provided on one of the supply unit 9 and the door 45 and a second separable coupling portion 993 (a protrusion accommodation recess) provided in the other one of the supply unit 9 and the door 45 so as to be coupled to the first separable coupling portion 991.

Hereinafter, a process whereby the above-described supply unit 9 supplies the additive to the tub 4 will be described.

As illustrated in FIG. 5, when the drum 5 rotates in the state in which water is supplied to the tub 4 to the level higher than the bottom surface of the drum, the water W inside the tub 4 moves from the bottom surface of the tub body 41 towards the tub cover 43 by the centrifugal force generated due to the rotation of the drum 5.

At least some of the water moved to the tub cover 43 moves to the first flow path 95 and the second flow path 96 of the supply unit 9 along the tub cover 43.

As illustrated in FIG. 3, the water introduced into the first flow path 95 and the second flow path 96 is introduced into the storage unit 94, in which the additive is stored, through the first communication portion 945 and the second communication portion 947.

When the level of a liquid that is a mixture of the water and the additive inside the storage unit 94 becomes higher than the free end of the discharge pipe 983, the liquid mixture inside the storage unit 94 is discharged to the tub 4 through the discharge hole 981 by the pressure of water. At the time when the liquid mixture inside the storage unit 94 is discharged through the discharge hole 981, a siphon phenomenon occurs inside the storage unit 94.

When a siphon phenomenon occurs inside the storage unit 94, the liquid mixture inside the storage unit moves to the discharge pipe 983 until the level thereof reaches the same level as the free end of the accommodation pipe 985. Therefore, the present invention may supply the additive inside the storage unit 94 to the tub 4 without a separate flow path for interconnecting the storage unit 94 and the water source.

FIG. 6 illustrates another embodiment of the supply unit 9 according to the present invention. The present embodiment has a feature in that the cross section of the storage unit 94 provided in the supply unit 9 (a cross section that is parallel to the bottom surface of the tub) has a circular shape.

That is, the storage unit 94 according to the present embodiment may include the circular bottom surface 942 and a partition 9421 provided along the edge of the bottom surface so as to protrude towards the cover 949, and the partition 9421 may include a partition through-hole 9423 for communication of the inside of the storage unit with the outside.

In this case, a flow path unit 97 according to the present embodiment may include a guide 973, which surrounds the circumferential surface of the partition 9421, and a base 971, which interconnects the guide and the circumferential surface of the partition 9421.

An inlet, through which water is introduced into the flow path unit 97, may be the same as that in the embodiment illustrated in FIG. 4.

That is, when the free end of the guide 973 extends to a height at which it is in contact with the door 45 (a position higher than the top surface of the cover), the inlet may be a guide through-hole (not illustrated) formed in the guide 973.

On the other hand, when the free end of the guide 973 is located lower than the top surface of the cover 949, the inlet may be the space H formed between the free end of the guide and the door 45 (or the space formed between the free end of the guide and the top surface of the cover).

The laundry treatment apparatus including the above-described supply unit 9 may be controlled so as to supply an additive (detergent) to laundry during washing and to supply an additive (e.g., a fabric softer) to laundry during rinsing.

That is, the operation of the laundry treatment apparatus of the present invention may include a water supply step of supplying water to the tub body 41, a cleaning step of rotating the drum 5 at a rotational speed that is less than a predetermined reference rotational speed, and a storage unit water supply step of moving at least some of the water stored in the tub body 41 to the flow path unit 95 and 96 (97) by rotating the drum 5 at a rotational speed that is equal to or greater than the predetermined reference rotational speed, the storage unit water supply step being initiated before the cleaning step is initiated or while the cleaning step is being performed.

The storage unit water supply step is a step of causing a siphon phenomenon by supplying the water inside the tub to the storage unit 94. The reference rotational speed may be set to a rotational speed that provides the water with centrifugal force required to cause at least some of the water stored in the tub body 41 to rise to the tub cover 43.

The cleaning step may be set to a washing step of separating impurities from laundry using an additive such as detergent, or may be set to a rinsing step of removing the detergent remaining on the laundry after completion of the washing step.

In any case, the cleaning step may include a first cleaning step of forming a water stream inside the tub body by rotating the drum at the rotational speed that is less than the reference rotational speed, a drainage step of discharging the water stored in the tub body after completion of the first cleaning step, an additional water supply step of supplying water to the tub body after completion of the drainage step, and a second cleaning step of forming a water stream inside the tub body by rotating the drum at the rotational speed that is less than the reference rotational speed.

When all of the cleaning steps are washing steps or when only the first cleaning step is a washing step, the storage unit water supply step may be performed after the water supply step is completed and before the first cleaning step is initiated. This serves to supply an additive (detergent) required for the first cleaning step to the tub body 41 via the storage unit water supply step.

In this case, the water supply step needs to supply water to the tub body 41 so that the level of water is maintained higher than the bottom surface of the drum 5 regardless of the amount of laundry stored in the drum. This serves to provide centrifugal force to the water stored in the tub body 41 via rotation of the drum 5.

When the cleaning step is a rinsing step, the storage unit water supply step may be performed after the additional water supply step is completed and before the second cleaning step is initiated. This is because an additive supplied in the rinsing step is, for example, a fabric softener that makes laundry soft, and the additive supplied to the laundry in the rinsing step needs to be supplied to the laundry in the last rinsing step in order to achieve a desired effect.

In this case, the water supply step needs to supply a preset amount of water to the tub body 41 depending on the amount of laundry, and the additional water supply step needs to supply water to the tub body so that the level of water inside the tub is maintained higher than the bottom surface of the drum regardless of the amount of laundry stored in the drum.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A laundry treatment apparatus comprising:
a tub body that defines a space configured to store water;
a tub cover that faces a top surface of the tub body and that defines an introduction opening;
a door located at the tub cover and configured to open and close the introduction opening;
a drum that is located inside of the tub body, that is configured to rotate relative to the tub body, and that is configured to accommodate laundry through the introduction opening;
a storage unit that is located in the door and that defines an additive space configured to store an additive;
a flow path unit configured to guide, to the storage unit, a portion of water moved upward from the tub body to the tub cover based on rotation of the drum relative to the tub body; and
a discharge unit configured to discharge, to the tub body, the additive and water from the storage unit,
wherein the storage unit comprises:
a body that defines the additive space, and
a cover that is located at a top surface of the body and that defines an additive introduction opening,
wherein the discharge unit comprises:
a discharge hole defined in the body,
a discharge pipe that protrudes from the body towards the cover and that surrounds the discharge hole, and
an accommodation pipe that protrudes from the cover towards the body, that is configured to receive the discharge pipe, and that is configured to guide water from the storage unit to the discharge pipe,
wherein the body comprises:
a bottom surface that defines the discharge hole,
a partition that surrounds the bottom surface and that connects the bottom surface to the cover, and
a communication portion defined in the partition and configured to allow communication between an inside of the body and an outside of the body, and
wherein the flow path unit comprises:
a guide that surrounds at least a portion of the partition,
an inlet configured to receive water from the tub cover and supply water to the guide, and
a base configured to guide water from the guide to the communication portion.

2. The apparatus according to claim 1, wherein the discharge unit includes a siphon configured to discharge, to the tub body, water and the additive from the storage unit.

3. The apparatus according to claim 1, wherein the discharge pipe has an end that is spaced apart from the cover, and
wherein the accommodation pipe has an end that is spaced apart from the body.

4. The apparatus according to claim 1, wherein the guide surrounds the communication portion.

5. The apparatus according to claim 1, wherein the inlet includes a guide through-hole that is defined in the guide and that is configured to introduce water from the tub cover to the base.

6. The apparatus according to claim 1, wherein the inlet includes a space that is defined between the guide and the door or between the guide and the cover, and
wherein a height of the guide from the bottom surface is less than a height of the partition from the bottom surface.

7. The apparatus according to claim 1, wherein the base further comprises a surface that is inclined towards the communication portion.

8. The apparatus according to claim 1, wherein the body is configured to couple to the door and to separate from the door.

9. The apparatus according to claim 1, further comprising:
a cabinet;
a drawer that defines a drawer space configured to accommodate the tub body, the drawer being configured to insert into or withdraw from the cabinet;
a water supply unit configured to supply water to the tub body; and
a drain unit configured to discharge water from an inside of the tub body to an outside of the cabinet.

10. A control method of a laundry treatment apparatus that includes a tub body configured to store water, a tub cover facing a top surface of the tub body and defining an introduction opening, a door located at the tub cover and configured to open and close the introduction opening, a drum rotatably provided inside of the tub body and configured to receive laundry through the introduction opening, a storage unit defining an additive space configured to store an additive and being located in the door, a flow path unit configured to guide water to the storage unit, and a discharge unit configured to discharge, to the tub body, the additive and water from the storage unit, wherein the storage unit comprises a body that defines the additive space, and a cover that is located at a top surface of the body and that defines an additive introduction opening, wherein the discharge unit comprises a discharge hole defined in the body, a discharge pipe that protrudes from the body towards the cover and that surrounds the discharge hole, and an accommodation pipe that protrudes from the cover towards the body, that is configured to receive the discharge pipe, and that is configured to guide water from the storage unit to the discharge pipe, wherein the body comprises a bottom surface that defines the discharge hole, a partition that surrounds the bottom surface and that connects the bottom surface to the cover, and a communication portion defined in the partition and configured to allow communication between an inside of the body and an outside of the body, and wherein the flow path unit comprises a guide that surrounds at least a portion of the partition, an inlet configured to receive water from the tub cover and supply water to the guide, and a base configured to guide water from the guide to the communication portion, the control method comprising:
supplying water to the tub body;
rotating the drum at a first rotational speed that is less than a reference rotational speed;
rotating the drum at a second rotational speed that is greater than or equal to the reference rotational speed; and
based on rotation of the drum at the second rotational speed, causing water to rise from the tub body to the tub cover to provide a portion of the water to the flow path unit.

11. The control method according to claim 10, further comprising providing the portion of the water to the base of the flow path unit through the guide.

12. The control method according to claim 11, further comprising:
    determining a rotational speed of the drum that causes water to rise from the tub body to the tub cover based on centrifugal force; and
    setting the rotational speed of the drum as the reference rotational speed.

13. The control method according to claim 12, wherein rotating the drum at the first rotational speed comprises:
    generating a first water stream inside of the tub body based on rotation of the drum at the first rotational speed;
    discharging water from the tub body based on completion of generating the first water stream;
    additionally supplying water to the tub body based on completion of discharging water; and
    based on additional supply of water, generating a second water stream inside of the tub body based on rotation of the drum at the first rotational speed.

14. The control method according to claim 13, wherein supplying water comprises supplying water to a level of water at an inside of the tub body, the level of water being vertically higher than a bottom surface of the drum, and
    wherein causing water to rise comprises causing water to rise after completion of supply of water to the level of water and before initiation of generating the first water stream.

15. The control method according to claim 14, wherein the additive is supplied from the storage unit to the tub body by rotating the drum at the second rotational speed, and
    wherein generating the first water stream comprises
    causing separation of impurities from laundry based on the first water stream that includes the additive.

16. The control method according to claim 13, wherein additionally supplying water comprises supplying water to a level of water at an inside of the tub body, the level of water being vertically higher than a bottom surface of the drum, and
    wherein causing water to rise comprises causing water to rise after completion of additional supply of water to the level of water and before initiation of generating the second water stream.

17. The control method according to claim 16,
    wherein the additive is supplied from the storage unit to the tub body by rotating the drum at the second rotational speed, and
    wherein generating the second water stream comprises
    causing an increase of softness of laundry based on the second water stream that includes the additive.

18. The control method according to claim 11, wherein rotating the drum at the second rotational speed includes rotating the drum at the second rotational speed before rotating the drum at the first rotational speed.

19. The control method according to claim 11, wherein rotating the drum at the second rotational speed includes rotating the drum at the second rotational speed after rotating the drum at the first rotational speed.

\* \* \* \* \*